US006954849B2

(12) United States Patent
Miller et al.

(10) Patent No.: US 6,954,849 B2
(45) Date of Patent: Oct. 11, 2005

(54) METHOD AND SYSTEM TO USE AND MAINTAIN A RETURN BUFFER

(75) Inventors: John Alan Miller, Portland, OR (US); Michael J. St. Clair, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 702 days.

(21) Appl. No.: 10/081,053

(22) Filed: Feb. 21, 2002

(65) Prior Publication Data

US 2003/0159018 A1 Aug. 21, 2003

(51) Int. Cl.[7] .................................................. G06F 9/42
(52) U.S. Cl. ..................................... 712/239; 712/220
(58) Field of Search ................................. 712/200–244

(56) References Cited

U.S. PATENT DOCUMENTS

| | | | | |
|---|---|---|---|---|
| 5,454,087 A | * | 9/1995 | Narita et al. ................. | 712/240 |
| 5,526,498 A | * | 6/1996 | Matsuo et al. ............... | 712/239 |
| 5,574,871 A | * | 11/1996 | Hoyt et al. ................... | 712/200 |
| 5,577,217 A | * | 11/1996 | Hoyt et al. ................... | 712/200 |
| 5,584,001 A | * | 12/1996 | Hoyt et al. ................... | 712/238 |
| 5,604,877 A | * | 2/1997 | Hoyt et al. ................... | 712/243 |
| 5,768,576 A | * | 6/1998 | Hoyt et al. ................... | 712/238 |
| 5,850,543 A | * | 12/1998 | Shiell et al. .................. | 712/238 |
| 5,964,868 A | | 10/1999 | Gochman et al. | |
| 6,151,671 A | | 11/2000 | D'Sa, et al. | |
| 6,253,315 B1 | | 6/2001 | Yeh | |
| 6,374,350 B1 | * | 4/2002 | D'Sa et al. .................. | 712/239 |
| 2003/0120906 A1 | * | 6/2003 | Jourdan et al. ............. | 712/242 |

OTHER PUBLICATIONS

D'Sa et al., System and Method of Maintaining and Utilizing Multiple Return Stack Buffers, U.S. Appl. No. 09/584,890, filed Jun. 1, 2000.

Hummel, et al., Return Register Stack Target Predictor, U.S. Appl. No. 09/474,180, filed Dec. 29,1999.

* cited by examiner

*Primary Examiner*—St. John Courtenay, III
(74) *Attorney, Agent, or Firm*—Blakely, Sokoloff, Taylor & Zafman LLP

(57) ABSTRACT

An instruction pipeline in a microprocessor includes one or more of the pipelines maintaining a return buffer. Upon detecting a call instruction, a pipeline will push the return address onto its return buffer. The pipeline will then determine if the call instruction was detected by a second pipeline and will send the return address to the second pipeline if the call was not detected by the second pipeline. Upon detecting a return instruction, the pipeline will pop the return address at the top of its return buffer. The return address may then be used in the instruction pipeline. The pipeline will send a request to a third pipeline to fill its return buffer with entries from the third pipeline's return buffer. The pipeline will determine if the return instruction was detected by a second pipeline and will send the return address at the top of its return buffer to the second pipeline if the return was not detected by the second pipeline.

30 Claims, 5 Drawing Sheets

METHOD AND SYSTEM TO USE AND MAINTAIN A RETURN BUFFER

BACKGROUND OF THE INVENTION

1. Field of the Invention

The invention relates to the field of return buffers. In particular, the invention relates to using and maintaining a return buffer in an instruction pipeline of a microprocessor.

2. Description of Related Art

Microprocessors have instruction pipelines in order to increase program execution speeds. However, when there is a branch instruction, the pipeline may stall while waiting for the branch condition to resolve before fetching the next instruction, since it is not known whether the branch will be taken. In order to prevent stalls in the pipeline while waiting for the next instruction to be fetched, microprocessors employ branch prediction circuitry to predict whether a branch will be taken. Certain types of branch instructions are associated with program calls to subroutines. A typical program calls a subroutine by issuing a call instruction, citing the address of the subroutine to which the program should branch. The subroutine typically ends with a return instruction, which causes a branch back to the program that issued the call. When the call instruction is executed, the address of the next sequential instruction is pushed onto a branch prediction buffer called a return buffer. When the return instruction is retired, the return buffer is popped, thereby providing the appropriate return address.

In a microprocessor that has multiple instruction sources, such as instruction fetch, instruction decode, and branch prediction, multiple pointers from each instruction source to the return buffer are maintained and the return address is sent from the return buffer to the appropriate instruction source when needed. However, there is the problem of latency for instruction sources or pipeline units that are not located close to the return buffer. Sources or units not located close to the return buffer may take a long time to obtain a correct return address from the return buffer, thus requiring a stall in the pipeline to wait for the return address.

BRIEF DESCRIPTION OF DRAWINGS

The invention is illustrated by way of example, and not by way of limitation, in the figures of the accompanying drawings in which like reference numerals refer to similar elements.

DETAILED DESCRIPTION OF THE INVENTION

Embodiments of a system and method for using and maintaining a return buffer are described. In the following description, numerous specific details are provided for a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
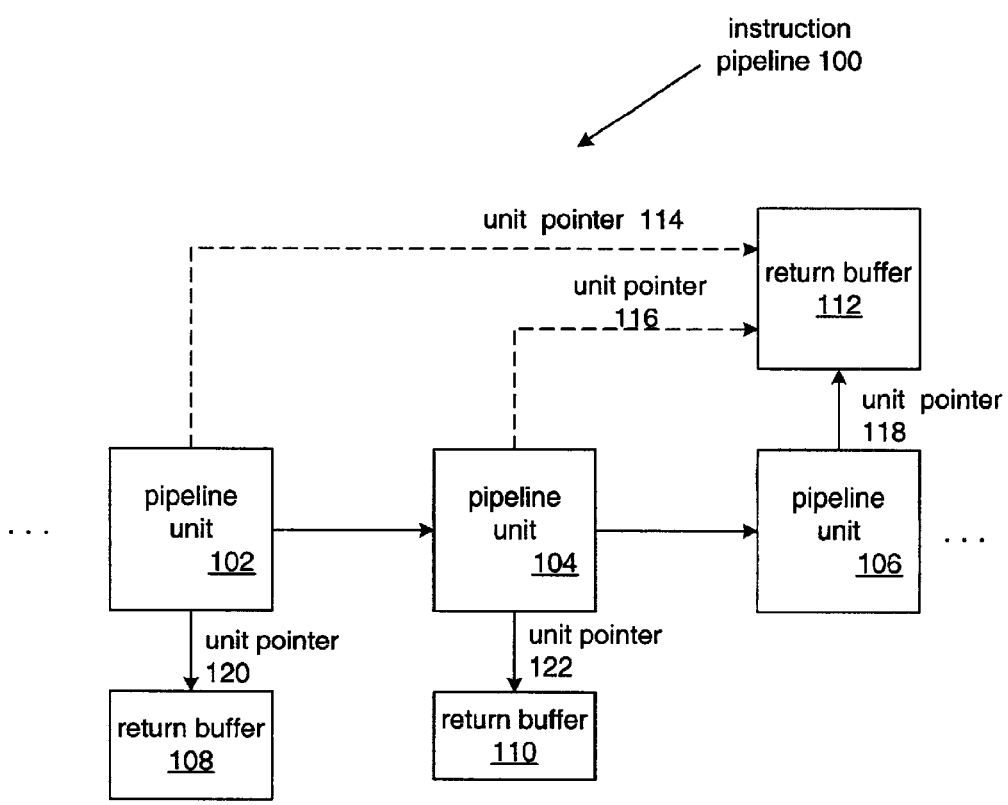
FIG. 1 is a block diagram illustrating one embodiment of the invention.

Referring to FIG. 1, one embodiment of an instruction pipeline 100 implementing the invention is illustrated. Those of ordinary skill in the art will appreciate that the instruction pipeline 100 may include more components than those shown in FIG. 1. However, it is not necessary that all of these generally conventional components be shown in order to disclose an illustrative embodiment for practicing the invention. In one embodiment of the invention, instruction pipeline 100 includes a plurality of pipeline units. For example, three pipeline units 102, 104, and 106 are illustrated in FIG. 1. Although three pipeline units are illustrated, the instruction pipeline 100 may include more or fewer units. Although the pipeline units of instruction pipeline 100 are illustrated in series, alternative arrangements are possible. For example, a pipeline unit may be connected in parallel with another pipeline unit.

In one embodiment of the invention, pipeline unit 102 may be an instruction source for instruction pipeline 100. For example, pipeline unit 102 may fetch instructions from main memory or cache and provide the fetched instructions to the instruction pipeline 100 for processing. In another embodiment of the invention, pipeline unit 102 may be an instruction decode unit that decodes instructions and then passes them on to another unit for processing. In the alternative, pipeline unit 102 may be a branch prediction unit that predicts whether branch instructions will be taken. In yet another embodiment of the invention, pipeline unit 102 may be a cache branch prediction unit for predicting branches in the cache. Those with ordinary skill in the art will appreciate that each pipeline unit may be any of various types of units, including but not limited to those described above. After each pipeline unit processes the instruction, the instruction is passed along to the next unit in the pipeline.

Instruction pipeline 100 processes various types of instructions, including subroutine call instructions. As explained above, a typical program calls a subroutine by issuing a call instruction. The called subroutine typically ends with a return from subroutine instruction. Instruction pipeline 100 includes one or more pipeline units that maintain a return buffer onto which return addresses are pushed. In one embodiment, the return buffer is a return stack. In the exemplary pipeline illustrated in FIG. 1, three return buffers 108, 110, and 112 are maintained by pipeline units 102, 104, and 106 respectively.

Each return buffer may be of equal or varying depth. For example, return buffer 112 may have greater depth, that is, contain more entries than return buffer 110. Each pipeline unit that maintains a return buffer maintains a pointer to that return buffer. For example, pipeline unit 102 maintains a pointer 120 to its return buffer 108. Likewise, pipeline unit 104 maintains a pointer 122 to its return buffer 110. A pipeline unit may maintain more than one pointer for its return buffer. For example, pipeline unit 106 may maintain three pointers, 114, 116, and 118, for pipeline units 102, 104, and 106 respectively. In the alternative, a pipeline unit may maintain pointers to more than one return buffer. For example, pipeline unit 102 may maintain a pointer 120 to return buffer 108 and a pointer 114 to return buffer 112. This way, if one return buffer becomes corrupted or has an incorrect return address, there is another source available from which to obtain the correct return address.

Figure 2:
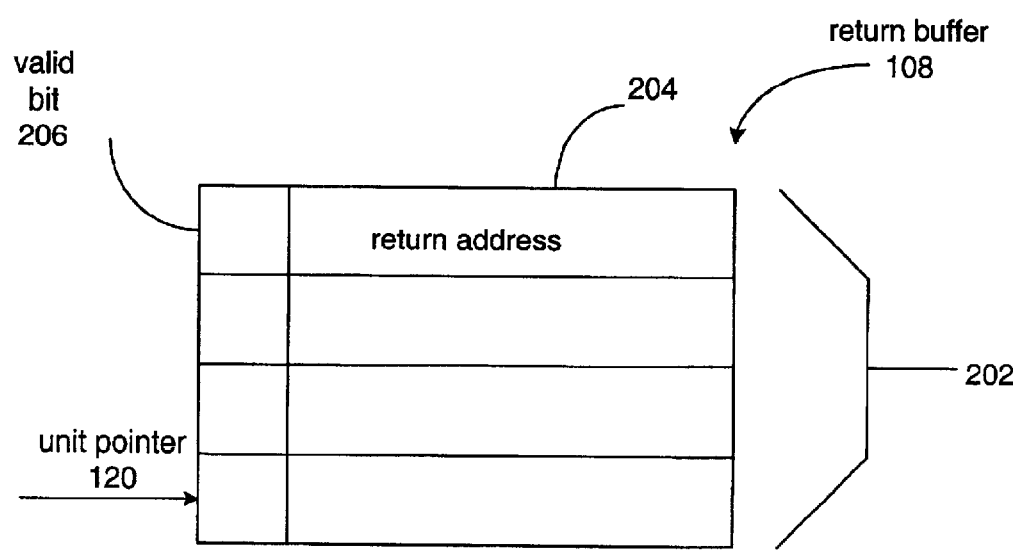
FIG. 2 illustrates one embodiment of a return buffer maintained by an instruction pipeline according to the invention.

Referring to FIG. 2, one embodiment of a return buffer 108 according to the invention is illustrated. The return buffer 108 has a number of entries 202. In one embodiment of the invention, each entry in the return buffer 108 contains two fields: a return address 204 and a valid bit 206. The valid bit 206 indicates whether the return address 204 is valid. In one embodiment of the invention, the return buffer is a return stack, and a unit pointer 120 is maintained to point to the return address at the top of the stack. New entries are pushed onto the top of the stack. When a return address is needed, the entry at the top of the stack is popped. The return address may then be used in the instruction pipeline.

Figure 3:
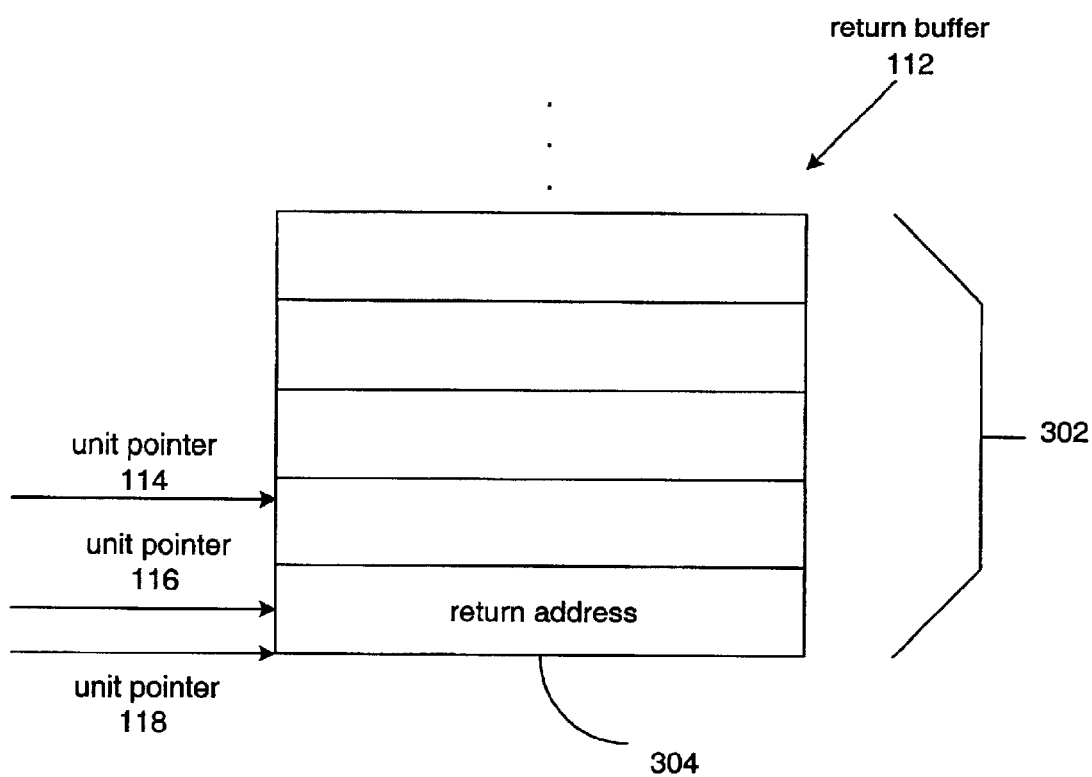
FIG. 3 illustrates one embodiment of a return buffer maintained with multiple pointers according to the invention.

Referring to FIG. 3, one embodiment of a return buffer 112 with multiple pointers is illustrated. Return buffer 112 has a number of entries 302. Each entry includes a return address 304. More than one unit pointer is maintained for return buffer 112. For example, three unit pointers 114, 116, and 118 are maintained for three different pipeline units. Each pointer may point to the same or different entries in return buffer 112. The different pointers allow different pipeline units to read the entries in return buffer 112 when return addresses are needed.

Figure 4:
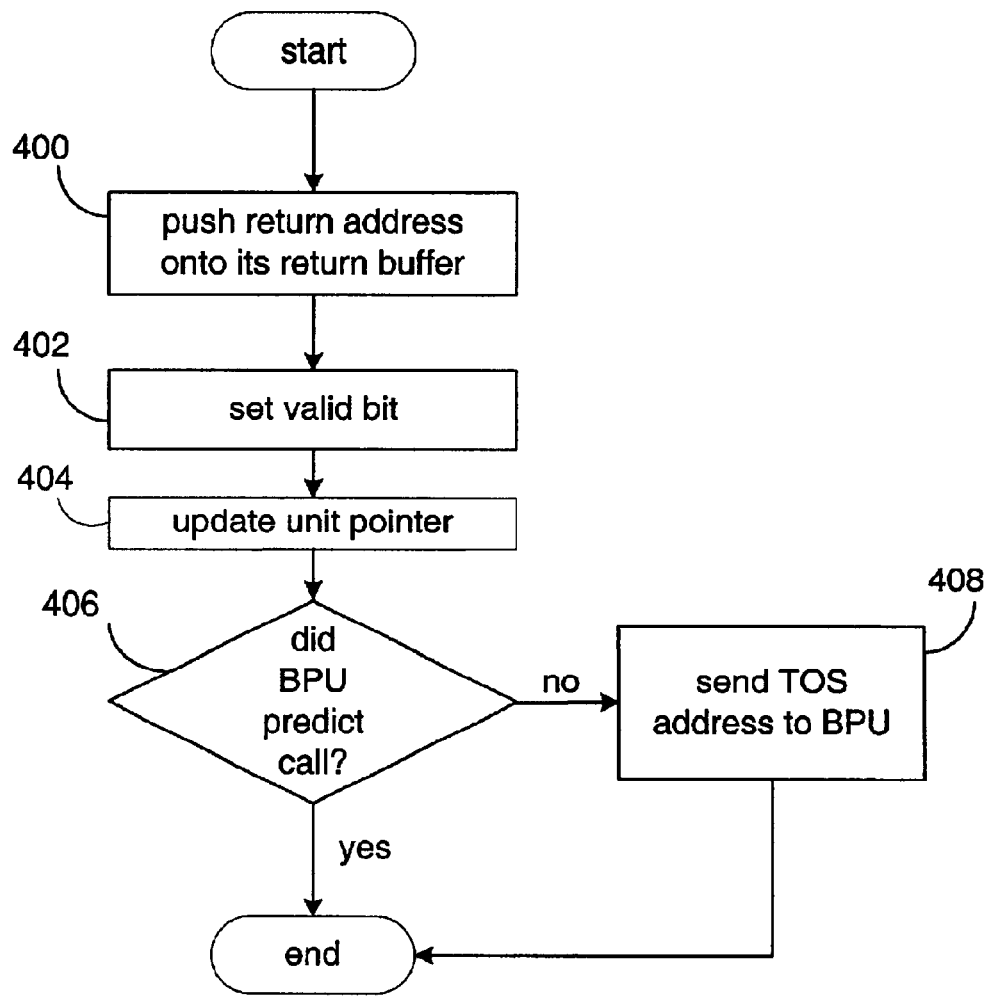
FIG. 4 is a flowchart that illustrates one embodiment of the process of the invention performed by an instruction pipeline upon detecting a call instruction.

Referring to FIG. 4, a flow chart illustrates one embodiment of the process of the invention performed by a first pipeline upon detecting a call instruction. First, at 400, the first pipeline unit pushes the return address onto the top of its return buffer. In one embodiment of the invention, the first pipeline unit may be an instruction decode or instruction translation unit. Then, at 402, the valid bit for the return buffer entry containing the return address is set to valid. Next, at 404, the first pipeline unit updates its pointer. For example, the first pipeline unit may increment the pointer. Then, at 406, the first pipeline unit determines if a second pipeline unit predicted the call instruction. In one embodiment of the invention, the second pipeline unit is a branch prediction unit (BPU) for predicting whether branches will be taken, and the first pipeline unit determines if the BPU predicted the call instruction. If the BPU predicted the call instruction, nothing needs to be done, and the process may end. If the BPU did not predict the call instruction, then, at 408, the first pipeline unit sends the return address at the top of its return buffer (TOS address) to the BPU.

Figure 5:
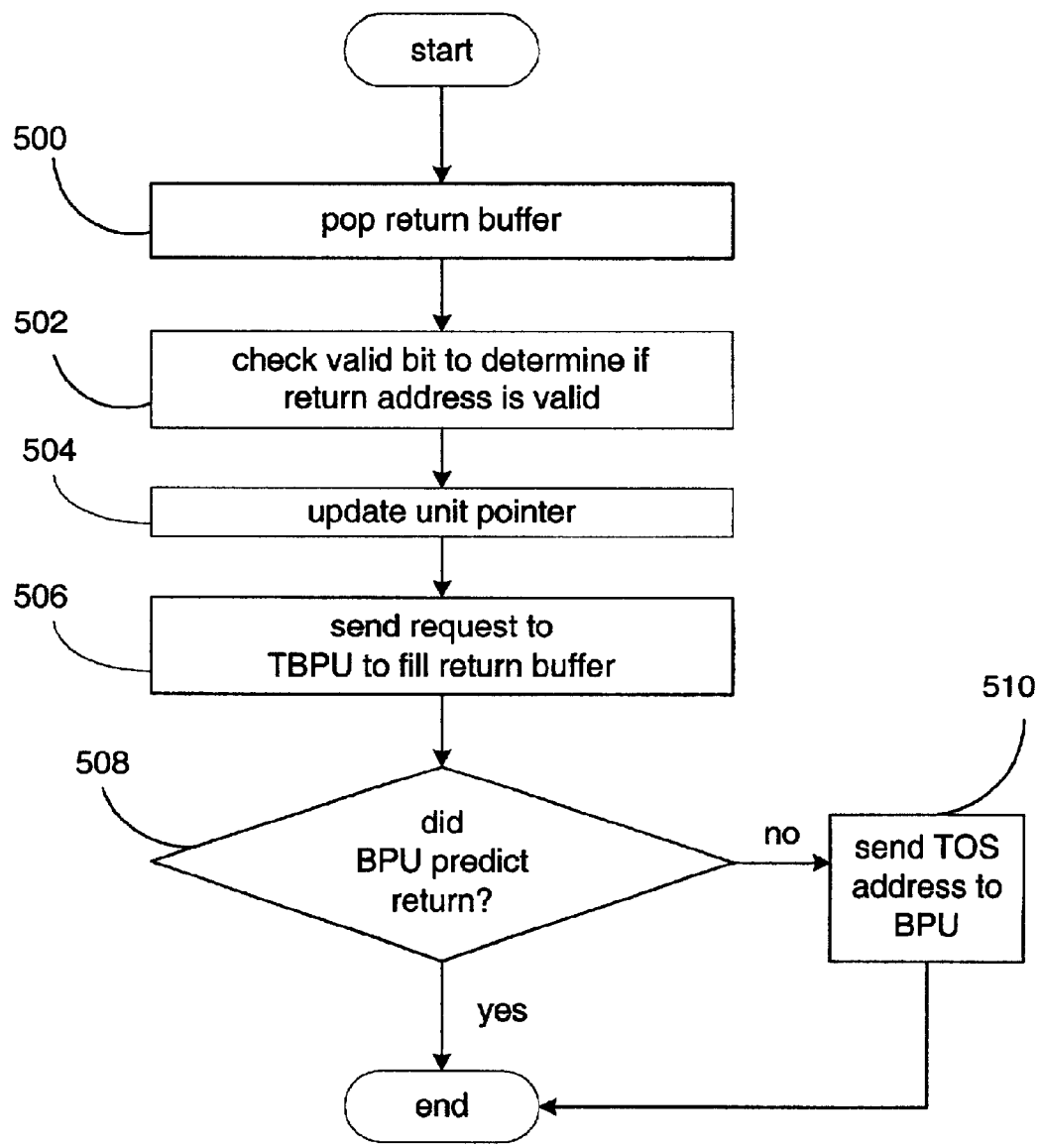
FIG. 5 is a flowchart that illustrates one embodiment of the process of the invention performed by an instruction pipeline upon detecting a return instruction.

Referring to FIG. 5, a flow chart illustrates one embodiment of the process of the invention performed by the first pipeline upon detecting a return instruction. First, at 500, the first pipeline unit pops its return buffer. Then, at 502, the first pipeline unit checks the valid bit of the popped entry to determine if the popped return address is valid. Next, at 504, the first pipeline unit updates its pointer. For example, the first pipeline unit may decrement the pointer. Then, at 506, the first pipeline unit sends a request to a third pipeline unit to fill the first pipeline unit's return buffer with entries from the third pipeline unit's return buffer. In one embodiment of the invention, the third pipeline unit is a branch prediction unit for predicting whether branch instructions will be taken. In one embodiment of the invention, the branch prediction unit may be a cache branch prediction unit for predicting branches in a cache or a trace branch prediction unit (TBPU) for predicting branches in a trace cache.

The third pipeline unit updates its return buffer pointers after sending its return buffer entries to the first pipeline unit. Then, at 508, the first pipeline unit determines if the second pipeline unit predicted the return instruction. If the second pipeline unit predicted the return instruction, nothing needs to be done and the process may end. If the second pipeline unit did not predict the return instruction, then, at 510, the first pipeline unit sends the return address at the top of its return buffer (TOS address) to the second pipeline unit.

In one embodiment of the invention, the instruction pipeline checks the cache to determine if there is a cache hit. The cache may be a trace cache. The instruction pipeline keeps looking in the cache until there is a hit. When there is a hit, a clear signal is sent to the decode unit, and the decode unit may clear its return buffer. The instruction pipeline will then execute instructions from the cache as long as there continues to be a cache hit. Then, when there is a cache miss, the TBPU may notify the decode unit and the decode unit then sends a request to the TBPU to fill the decode unit's return buffer with entries from the TBPU's return buffer.

An illustrative example of the method according to the invention will now be described. For purposes of illustration, assume that the instruction pipeline includes three pipeline units that each maintain a return buffer: the TBPU, BPU, and instruction translation unit (IXLAT). The return buffers in this example are return stacks. Three pointers are maintained with the TBPU return buffer: a TBPU pointer, a BPU pointer, and an IXLAT pointer. Assume that the TBPU return buffer contains the following return addresses: 0XA000, 0XB000, 0XC000, 0XD000, etc. The address 0XA000 is at the top of the stack. Initially, all three pointers are pointing to the top of the stack. The IXLAT return buffer is a two-entry deep return buffer for purposes of this example. Initially, there are no valid entries in the IXLAT return buffer. The BPU return buffer is a one-entry deep return buffer for purposes of this example.

Assume that the instruction pipeline is executing out of the cache. This continues as long as there is a cache hit. When there is a cache miss, the TBPU notifies the IXLAT. The IXLAT then sends a request to the TBPU for a return address. The TBPU sends the IXLAT the address pointed to by the IXLAT pointer: address 0XA000. The IXLAT pushes this return address onto the top of its return buffer, sets the valid bit for this entry to valid, and updates its top of stack pointer to point to address 0XA000. The TBPU also updates the IXLAT pointer to point to the next return address, which is 0XB000. Then, since the IXLAT return buffer still contains one empty entry, the IXLAT sends a request to the TBPU to fill the IXLAT return buffer. The TBPU sends the address 0XB000 to the IXLAT, and then updates the IXLAT pointer to point to the next address, which is 0XC000. The IXLAT puts the address 0XB000 into its return buffer and sets the valid bit to valid. The IXLAT return buffer is now full with two entries: 0XA000 (at the top of the stack) and 0XB000.

During decode, when the IXLAT detects a call instruction, it will push the return address onto its return buffer. For example, if the IXLAT detects a call instruction with a return address 0XF000, the IXLAT will push the address 0XF000 onto the top of its return buffer, set the valid bit to valid, and update its top of stack pointer to point to the address 0XF000. The IXLAT return buffer now has two entries: 0XF000 (at the top of the stack) and 0XA000. The IXLAT then determines if the BPU predicted the call instruction. If the BPU did not predict the call instruction, the IXLAT will send the address 0XF000 to the BPU. The BPU will then push this address onto the top of its return buffer.

If the IXLAT detects a return instruction, it will pop its return buffer and retrieve the address 0XF000. The IXLAT will check the valid bit of the popped address to determine if the address is valid. If the address is valid, it may then be used in the instruction pipeline. The IXLAT will update its top of stack pointer to point to the next address 0XA000. Then, the IXLAT will send a request to the TBPU to fill the IXLAT return buffer. The IXLAT will determine if the BPU detected the return instruction. If the BPU did not detect the return instruction, the IXLAT will send the top of stack address 0XA000 to the BPU. If the IXLAT detects another return instruction while waiting for the TBPU to fill the IXLAT return buffer, the IXLAT will pop the address 0XA000. Then, the IXLAT return buffer will be empty. If the IXLAT detects another return instruction while its return buffer is empty, it will stall until it receives entries from the TBPU return buffer.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method comprising:
   maintaining first and second return buffers for first and second instruction pipelines respectively, both buffers having a plurality of return address entries; and
   sending a request to the second instruction pipeline to fill the first return buffer with the entries in the second return buffer.

2. The method of claim 1, further comprising detecting a return instruction prior to sending a request to the second instruction pipeline to fill the first return buffer with the entries in the second return buffer.

3. The method of claim 2, further comprising popping the first return buffer after detecting a return instruction.

4. The method of claim 3, further comprising updating a pointer to the first return buffer after popping the first return buffer.

5. The method of claim 2, further comprising determining if the return instruction was detected by a third instruction pipeline and sending a return address in the first return buffer to the third instruction pipeline if the return instruction was not detected by the third instruction pipeline.

6. The method of claim 5, wherein determining if the return instruction was detected by a third instruction pipeline comprises determining if the return instruction was detected by a pipeline for predicting whether branches will be taken.

7. The method of claim 2, further comprising detecting a call instruction prior to detecting a return instruction.

8. The method of claim 7, further comprising pushing a return address corresponding to the call instruction onto the first return buffer after detecting a call instruction.

9. The method of claim 8, further comprising updating a pointer to the first return buffer after pushing the return address onto the first return buffer.

10. The method of claim 9, further comprising determining if the call instruction was detected by a third instruction pipeline and sending a return address in the first return buffer to the third instruction pipeline if the call instruction was not detected by the third instruction pipeline.

11. The method of claim 8, wherein each entry in the first return buffer comprises a valid bit that indicates whether the corresponding return address is valid.

12. The method of claim 11, further comprising checking the valid bit corresponding to each popped return address to determine if the return address is valid.

13. The method of claim 1, wherein maintaining a first return buffer for a first instruction pipeline comprises maintaining a first return buffer for a pipeline to translate instructions fetched from a memory device.

14. The method of claim 1, wherein maintaining a second return buffer for a second instruction pipeline comprises maintaining a second return buffer for a pipeline that predicts branches in a cache.

15. The method of claim 1, wherein the first and second return buffers are return stacks.

16. An instruction pipeline in a microprocessor comprising:
   a decode unit, the decode unit to maintain a first return buffer having a plurality of return address entries; and
   a branch prediction unit, the branch prediction unit to maintain a second return buffer and to fill the first return buffer with entries from the second return buffer.

17. The instruction pipeline of claim 16, wherein the decode unit to further recognize call instructions and return instructions.

18. The instruction pipeline of claim 17, wherein the branch prediction unit to fill the first return buffer with entries from the second return buffer comprises the branch prediction unit to fill the first return buffer with entries from the second return buffer each time the decode unit recognizes a return instruction.

19. The instruction pipeline of claim 17, further comprising a second branch prediction unit, the decode unit to send the second branch prediction unit a return address in the first return buffer if the decode unit recognizes a call instruction or a return instruction that the second branch prediction unit did not recognize.

20. The instruction pipeline of claim 16, wherein decode unit to further send a request to the branch prediction unit to fill the first return buffer with entries from the second return buffer each time the first return buffer is not full.

21. The instruction pipeline of claim 16, wherein the branch prediction unit comprises a cache branch prediction unit to predict branches in a cache.

22. The instruction pipeline of claim 21, wherein the cache branch prediction unit to notify the decode unit when there is a cache miss and the decode unit to send a request to the cache branch prediction unit to fill the first return buffer with entries from the second return buffer.

23. A method comprising:
   maintaining a return buffer for a decode unit, the return buffer having a plurality of return address entries;
   detecting a call instruction;
   determining if the call instruction was detected by a branch prediction unit; and sending a return address to the branch prediction unit if the call instruction was not detected by the branch prediction unit.

24. The method of claim 23, further comprising pushing a return address corresponding to the call instruction onto the return buffer.

25. The method of claim 23, further comprising detecting a return instruction.

26. The method of claim 25, further comprising popping a return address from the return stack buffer.

27. The method of claim 26, wherein each entry in the return buffer comprises a valid bit that indicates whether the return address is valid.

28. The method of claim 27, further comprising checking the valid bit corresponding to the popped return address to determine if the return address is valid.

29. The method of claim 25, further comprising determining if the return instruction was detected by the branch prediction unit and sending a return address in the return buffer to the branch prediction unit if the return instruction was not detected by the branch prediction unit.

30. The method of claim 23, further comprising sending a request to a cache branch prediction unit to fill the return buffer.

* * * * *